INVENTOR.
Paul A. Biek
BY
Herman E. Smith
ATTORNEY

June 4, 1963
P. A. BIEK
3,092,201
POWER STEERING APPARATUS
Filed Dec. 20, 1961
2 Sheets-Sheet 2
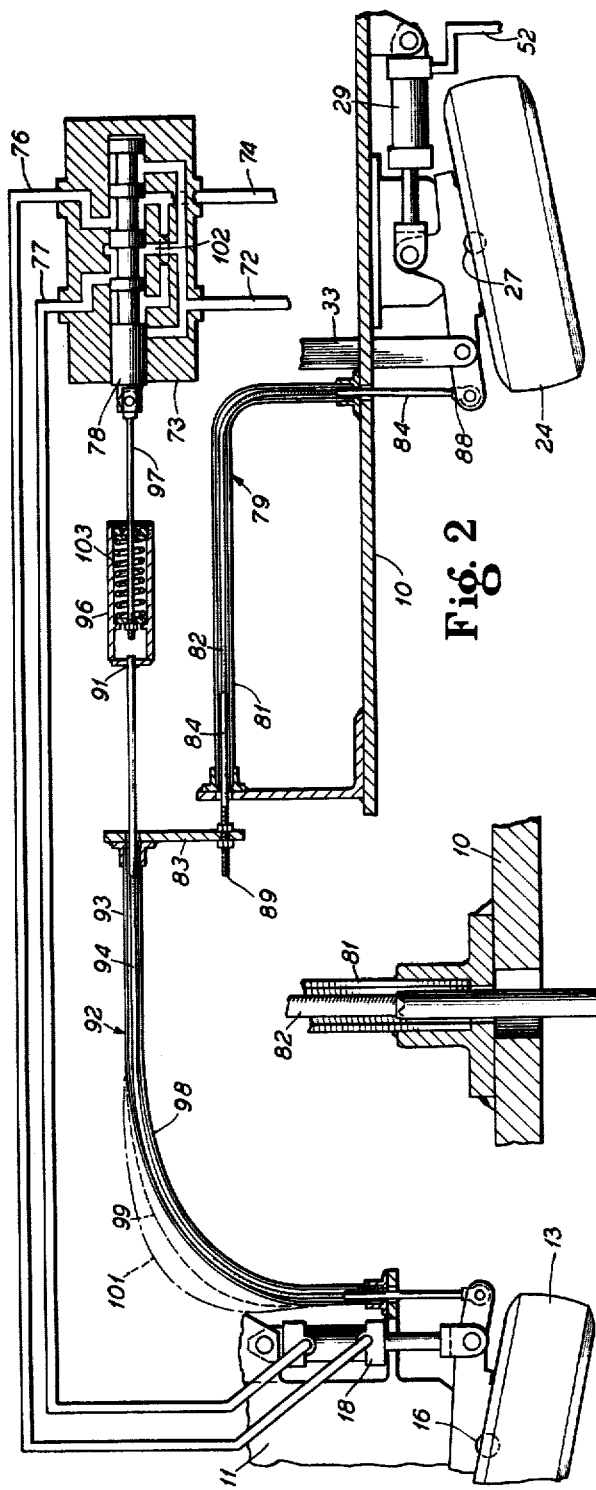
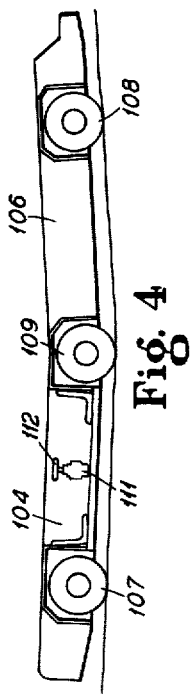
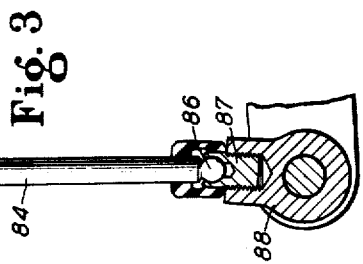
INVENTOR.
Paul A. Biek
BY
Herman E. Smith
ATTORNEY

United States Patent Office 3,092,201
Patented June 4, 1963

3,092,201
POWER STEERING APPARATUS
Paul A. Biek, Chicago, Ill., assignor to Goodman Manufacturing Company, Chicago, Ill., a corporation of Illinois
Filed Dec. 20, 1961, Ser. No. 160,806
9 Claims. (Cl. 180—79.2)

This invention relates generally to power steering apparatus and more particularly to flexible cables for actuating control devices in said apparatus.

In power steering apparatus, it has been customary to transmit steering motion through a system of mechanical linkages which include push-pull rods, bell cranks and similar devices. In special purpose vehicles such as mine shuttle cars, the number and variety of such linkages is increased as a result of having steerable wheels on each end of the car which must be coordinated with each other. These linkages are further complicated by the requirement that they avoid interference with the cargo compartment, by longitudinally flexible car bodies and by equalizer mounted wheels. These linkages are objectionable in that they are expensive to manufacture, difficult to adjust, subject to wear and looseness in the joints, and occupy space which could be given to the cargo compartment.

Accordingly, it is a principal object of the present invention to provide flexible coaxial push-pull cables for transmitting steering motion to various points in a vehicle body.

Another object is to correlate the steering movement of a pair of power steered wheels by means of a flexible coaxial push-pull cable.

A further object is to automatically regulate the position of a remote steerable wheel by means of a flexible coaxial push-pull cable and to return the wheel to its preselected position when forcibly deflected therefrom.

In the drawings:

FIG. 2 is a fragmentary view to enlarged scale of a portion of FIG. 1 showing a valve and the coaxial cable in section;

FIG. 3 is a section view of the coaxial cable connected between a wheel and the frame; and FIG. 4 is a side view of a mine shuttle car having a flexible body with steerable wheels on each end in which the steering apparatus of the present invention is particularly useful.

Figure 1:
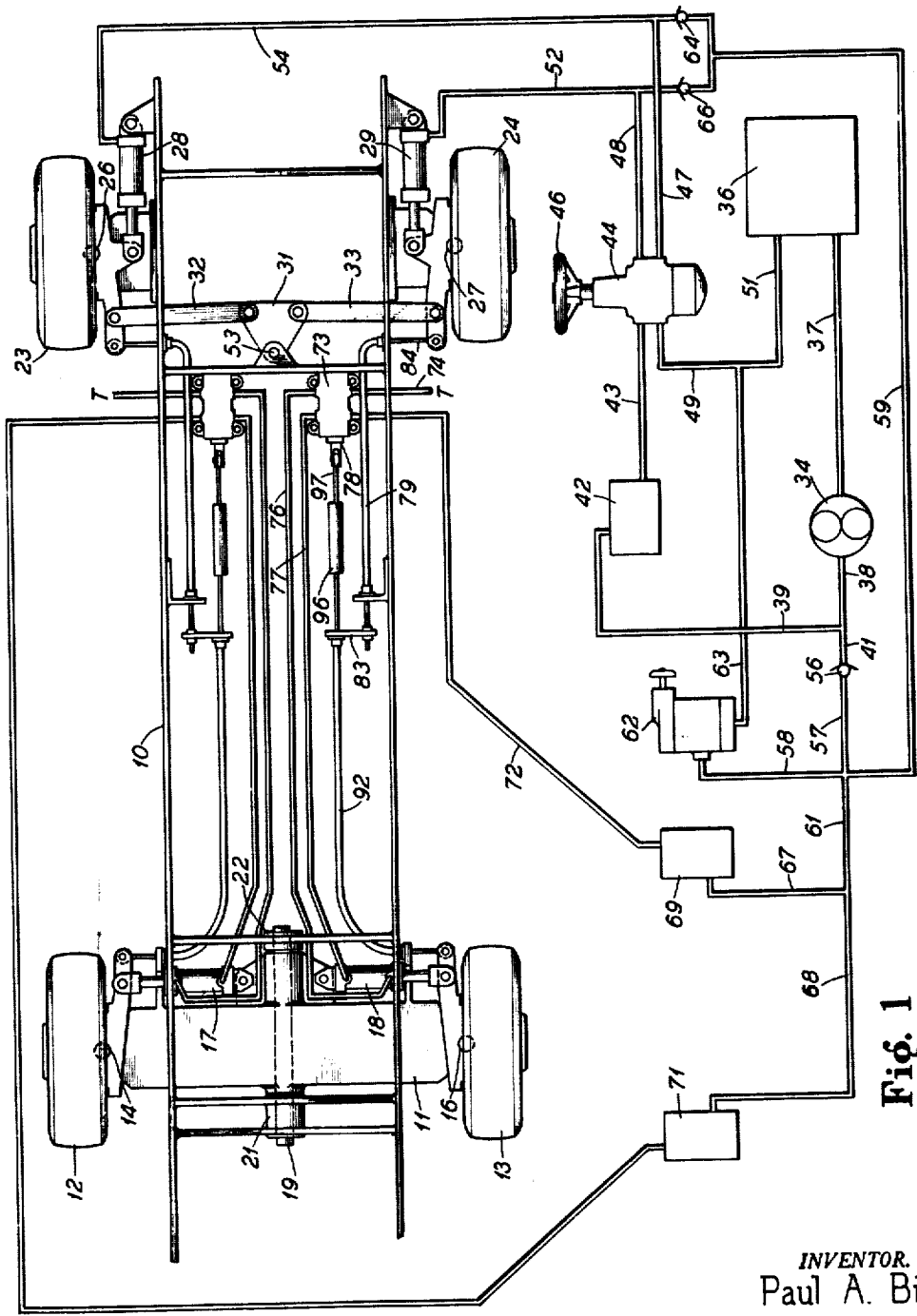
FIGURE 1 is a schematic diagram of a 4-wheel power steered vehicle showing the coaxial cable of the present invention arranged to correlate the steering movement of side pairs of wheels.

Referring now to FIG. 1, the numeral 10 refers to a vehicle frame having an equalizer device 11 mounted thereon for permitting vertical movement of wheels 12 and 13 relative to frame 10. Wheels 12 and 13 are pivotally mounted on equalizer 11 at pivotal joints 14 and 16. Steerable movement of wheels 12 and 13 is provided by double acting hydraulic pistons and cylinder devices 17 and 18, which are connected between equalizer 11 and wheels 12 and 13. Equalizer 11 is pivotally mounted on frame 10 by means of shaft 19 in bushings 21 and 22.

Wheels 23 and 24 are pivotally mounted at 26 and 27 on the other end of frame 10. Single acting piston and cylinder devices 28 and 29 are connected between frame 10 and wheels 23 and 24 respectively to provide steering movement therefor. A bell crank 31 and links 32 and 33 also interconnect wheels 23 and 24 with each other and with frame 10. The purpose of bell crank 31 and links 32 and 33 is to apportion different degrees of steering movement to wheels on opposite sides of the vehicle when moving in a curved path.

Wheels 23 and 24 are steered by the following described hydraulic apparatus. A pump 34 draws fluid from tank 36 through conduit 37. The fluid is pressurized and delivered to conduits 38, 39 and 41. Conduit 39 delivers fluid to flow control valve 42 which admits a predetermined portion of the output from pump 34 to conduit 43, thereby forcing the remainder of the pump output into conduit 41. Conduit 43 communicates with steering control valve 44 which has hand wheel 46 for manually directing the output of valve 44. Hand wheel 46 functions as a steering wheel for the vehicle. While the internal construction of valve 44 is not shown in the drawings, it is of a well known, commercially available type which is capable of communicating pressure fluid from conduit 43 to either of conduits 47 or 48, the other of conduits 47 or 48 communicating with return conduit 49 to permit spent fluid to return to tank 36 through conduit 51.

For example, turning hand wheel 46 in one direction will admit pressure fluid to conduit 48 which in turn communicates with conduit 52 and cylinder 29. Admission of pressure fluid to cylinder 29 is effective to pivot wheel 24 about pivot 27 to a position as shown in FIG. 2. This movement of wheel 24 exerts a pull on lever 33 which in turn rocks bell crank 31 about its pivotal connection 53. The pivoting of bell crank 31 exerts a pull on link 32 which pivots wheel 23 about its pivot 26. Pivotal movement of wheel 23 forces the piston further into cylinder 28 to expel fluid therefrom into conduit 54 from which the spent fluid returns to tank 36 through conduit 47, valve 44 and conduits 49 and 51.

Steering in the opposite direction is accomplished by turning hand wheel 46 in the opposite direction with the consequence that the fluid travels through conduits 47, 54 and 52 in the reverse direction.

Wheels on opposite sides of the vehicle must be provided with different degrees of steering movement so that the wheels are tangent to respective of concentric circular arcs drawn about a common turning center. Accordingly, the pivotal connection points of bell crank 31 are arranged to impart different degrees of steering movement to wheels 23 and 24 when they are turned from the straight direction. Wheels on the same side of the vehicle must be provided with like degrees of steering movement since they must be tangent to the same arc. Therefore, apparatus is provided for correlating the steering movement of wheel 13 to wheel 24 and wheel 12 to wheel 23. This apparatus on each side of the vehicle is similar and therefore only one side will be described in detail.

As previously mentioned, a preselected portion of the output of pump 34 is supplied to conduit 41. The fluid passes through check valve 56 to conduits 57, 58, 59 and 61. Conduit 58 communicates with a relief valve 62 which determines the pressure at which the hydraulic system operates. Excess fluid is passed to tank through conduit 63. Conduit 59 communicates with check valves 64 and 66 which are in conduits 52 and 54 to provide pressure relief where either wheel 23 or 24 is forcibly deflected from its proper position by an external force.

Fluid in conduit 61 is divided between conduits 67 and 68 as a result of flow control valves 69 and 71. Fluid passes from flow control valve 69 to conduit 72 and valve 73 which is shown in section FIG. 2. The internal construction of valve 73 is such that fluid may be returned to tank 36 through conduit 74 or supplied to either end of cylinder 18 through respective of conduits 76 and 77, depending upon the position of the longitudinally movable selector spool 78. As wheel 24 is steered, selector spool 78 is moved to an operative position for supplying fluid to an appropriate end of cylinder 18 and is then returned to an inoperative position when wheel 13 assumes a position corresponding to wheel 24. This result is obtained by the arrangement of cables shown to enlarged scale in FIG. 2.

A flexible coaxial push-pull cable 79 is comprised of an outer flexible sheath 81 and an inner flexible wire 82. Sheath 81 is attached to frame 10 at each of its ends and is shown with a bend intermediate its length. While only one bend is shown, it should be understood that the sheath may be routed along the vehicle body in a great variety of ways and may have several bends which can lie in different planes when required. The inner flexible member 82 is connected between a portion of wheel 24 and a slide 83 to transmit the steering movement of wheel 24 to slide 83. The use of cable 79 is desirable for convenience in locating valve 73 and slide 83, but may be eliminated or replaced by other linkage where it is possible to attach slide 83 more directly to wheel 24 or an associated member such as link 33. It should also be noted that while inner wire 82 is shown as connected to wheel 24, it could also be connected to some part associated with wheel 24 such as the link 33 or a movable portion of cylinder and piston 29.

The structure of the coaxial cable 79 is shown to enlarged scale in FIG. 3. In order to transmit column loads by means of the flexible inner member 82, a stiff extension member 84 may be provided which extends outward from the ends of sheath 81. This extension member 84 may also be provided with a ball end 86 fitted in a mating socket 87 for attachment to machine members such as 88. The extension member 84 may also be threaded as at 89 or provided with other types of connections as at 91.

Another flexible cable 92 provides the principal apparatus for correlating the movement of wheels 13 and 24. Cable 92 is similar in construction to cable 79 and has a flexible sheath 93 encircling a flexible inner wire 94. One end of sheath 93 is fastened to equalizer 11 and the other end is connected to slide 83. The flexible inner member 94 has one end connected to wheel 13 or an associated part while its other end is connected to a spring case 96. The inner rod 97 of spring case 96 is connected to selector spool 78.

As shown in FIG. 2, the slide 83 has been moved from its normal position toward valve 73. Movement of slide 83 has in turn moved the free end of sheath 93 and flattened out a curved portion of the cable. The normal position of the curved cable portion is indicated by phantom line 99. Movement of slide 83 toward valve 73 causes the curved cable portion to assume the position numbered 98 while movement of slide 83 in the opposite direction causes the curved cable portion to assume the position numbered 101. It is immediately apparent that the arc lengths around the curved cable portion is different for each of the positions 98, 99 and 101. The change in length in sheath 93 is accounted for in movement of slide 83. The change in length of inner member 94 is taken up in movement of spring case 96. Thus, when slide 83 has been moved toward valve 73 thereby changing the curvature of the cable 92 from position 99 to position 98, the inner member 94 is fed outward in the same direction as slide 83. The resulting movement of spring case 96 moves rod 97 which in turn moves selector spool 78 to the position shown in FIG. 2. In the position shown in FIG. 2, the valve 73 and spool 78 cooperate to communicate pressure fluid from conduit 72 to conduit 77 where the fluid is admitted to cylinder 18. Cylinder 18 moves wheel 13 to a position as shown in FIG. 2 corresponding to the position of wheel 24. When wheel 13 assumes a position corresponding to wheel 24, the inner member 94 is slid longitudinally within sheath 93 thereby moving spring case 96 in the opposite direction away from valve 73. Spring case 96 exerts a force on rod 97 to move spool 78 toward its normal position thereby closing the port 102 to seal off pressure fluid from conduit 72. At the same time, tank conduit 74 is also sealed to trap columns of fluid in conduits 76 and 77 for holding wheel 13 in its new position.

In order to return wheels 13 and 24 to the straight position shown in FIG. 1, the hand wheel 46 is turned to straighten wheel 24. The movement of wheel 24 would then move slide 83 in a direction away from valve 73 as viewed in FIG. 2. This movement of slide 83 moves cable 92 to its normal position 99 which causes inner member 94 to exert a pull on spring case 96. The spring case 96 pulls on rod 97 to move selector 78 so that there is communication between port 102 and conduit 76. Conduit 76 admits pressure fluid to the front end of cylinder 18 which moves wheel 13 to a straight position corresponding to the now straight position of wheel 24. The movement of wheel 13 pushes the inner member 94 through sheath 93 to push spring case 96. Spring case 96 pushes rod 97 to return spool 78 to its inoperative position where it seals port 102.

Since movement of spool 78 between operative and inoperative positions may be in the order of ⅜-inch while the order of movement of the wheel may be several inches, spring case 96 is provided to take up the difference in length. By using a preloaded compressor spring such as 103, preloaded for example to a value of 25 pounds, it is possible to provide quick response in the system and at the same time take up the overtravel in the apparatus.

The cable 92 has a further function in addition to initially locating wheel 13 in a position corresponding to wheel 24. In operation it sometimes occurs that a wheel such as 13 will be forceably deflected from its proper position by encountering an external force such as might be applied in encountering a deep rut or hitting a rail or other obstruction. In such cases, wheel 13 might be forcibly moved thereby expelling a fluid from cylinder 18 through seals, fittings, or a relief valve not shown in the drawings. In such a case, provided the position of wheel 24 and slide 83 has remained stationary, the forceable movement of wheel 13 will slide inner member 94 through sheath 93 to move spool 78 in a direction to supply make-up fluid to cylinder 18. The new supply of make up fluid will return wheel 13 to its correct position which will, in turn, slide inner member 94 in the opposite direction to return spool 78 to its inoperative position.

Upon steering movement of wheel 24 in a direction opposite to that shown in FIG. 2, the slide 83 would be moved in a direction away from valve 73 causing cable 92 to move from position 99 to position 101. In such case, the effective length of cable 92 would be changed, causing inner member 94 to pull on spool 78 to supply fluid to the front end of cylinder 18. Upon wheel 13 assuming a position corresponding to wheel 24, inner member 94 would be pushed through sheath 93 to push spool 78 to its inoperative position.

The foregoing description has been applied to wheels 13 and 24 and it will be readily observed from an inspection of FIG. 1 that there are corresponding parts associated with wheels 12 and 23 which serve the same purpose and operate in the same manner as those already described.

The use of a flexible coaxial cable such as 92, together with flexible hoses for conduits such as 76 and 77, provides an apparatus which is very desirable for incorporation in vehicles such as mine shuttle cars. As shown in FIG. 1, the wheels 12 and 13 are mounted on equalizer 11 for vertical movement relative to frame 10. The use of a flexible cable such as 92 for transmitting the steering signal eliminates much complicated steering gear.

The flexible control means of the present invention is particularly useful in a flexible shuttle car as shown in FIG. 4. An elongated body is comprised of two portions 104 and 106 which are hinged together end-to-end about a transverse hinge. Each end of the car has steerable wheels such as 107 and 108. The car is supported near the transverse hinge by wheels such as 109. An operator's control station is located on one of the body portions and is indicated in FIG. 4 by the control valve 111 and hand wheel 112. Wheels 107 and 108 are similar to previously described wheels 13 and 24. Valve 111 and wheel 112 are similar to previously described valve and hand wheel 44 and 46. The steerable wheels 107 and 108 are steered and their steering movements are correlated to each other in a manner similar to that described for wheels 13 and 24 above. The flexible control means transmits steering signals from one end of the body to the other, past the flexible hinge, without undue multiplication of linkages and joints.

While I have shown and described a preferred form of the invention, it is to be understood that various changes and modifications can be made without departing from the scope and spirit of the appended claims.

I claim as my invention:

1. In powered remote positioning apparatus having provision for feeding back the position of a remote movable body to a control device for controlling the position of said body, the improvement comprising:

an elongated flexible coaxial cable having an inner flexible member slideable longitudinally relative to an outer flexible sheath;

said inner flexible member having one end connected to said remote movable body and the other end connected to a selector on said control device;

said outer sheath having a first portion fixed against longitudinal movement relative to said control device, a second curved flexible portion free to move transversely, and a third portion movable longitudinally to selected positions relative to said first portion;

whereby longitudinal movement of said third portion is effective to vary the curvature of said second portion to move said selector to an operative position, and said inner flexible member is effective to move said selector away from said operative position in response to movement of said remote body.

2. In powered apparatus for moving a remote body in synchronism with a proximate body including power means for moving said remote body and control means for said power means, said control means having a selector device movable between inoperative and operative positions, the improvement comprising:

an elongated flexible coaxial cable having a curved portion intermediate its ends, said cable having an inner flexible member slidable longitudinally relative to an outer flexible sheath;

said inner member having one end connected to said remote body and its other end connected to said selector device;

said sheath having one portion on one side of said curved cable portion fixed against movement and another portion on the other side of said curved cable portion movable longitudinally of said cable and operably connected to said proximate body for movement therewith;

whereby the curvature of said cable is changed responsive to movement of said other sheath portion and proximate body, the said change in curvature modifying the effective length of said cable to move said selector device to an operative position for moving said remote body, the resulting movement of said remote body sliding the said inner member to move said selector device to an inoperative position as the remote body assumes a position corresponding to said proximate body.

3. In powered apparatus for moving a remote body in synchronism with a proximate body including power means for moving said remote body in forward and reverse directions and control means for said power means, said control means having a selector device movable between a forward operative position and a reverse operative position, the improvement comprising:

an elongated flexible coaxial cable having a curved portion intermediate its ends, said cable having an inner flexible member slideable longitudinally relative to an outer flexible sheath;

said inner member having one end connected to said remote body and its other end connected to said selector device;

said sheath having one portion on one side of said curved cable portion fixed against movement and another portion on the other side of said curved cable portion movable longitudinally of said cable and operably connected to said proximate body for movement therewith;

whereby the curvature of said cable is changed responsive to movement of said other sheath portion and proximate body, the said change in curvature modifying the effective length of said cable to urge said selector device toward one of its operative positions for moving said remote body, the resulting movement of said remote body sliding said inner member to urge said selector away from the said one operative position as the remote body assumes a position corresponding to said proximate body.

4. In power steering apparatus, improved means for moving a second wheel in synchronism with a first wheel comprising:

first and second steerable wheels mounted on a frame;

power means connected between said second wheel and said frame for moving said second wheel relative thereto;

control means for said power means mounted on said frame including a selector device movable between operative and inoperative positions;

a flexible, coaxial, push-pull cable having an inner flexible member and an outer flexible sheath, said inner member being connected between said second wheel and said selector device for sliding movement within said sheath, said sheath having a first portion connected to said frame, a second curved portion free to move transversely of itself, and a third portion free to move in its axial direction, said third portion being operably connected to said first wheel for movement as said first wheel is steered;

whereby steering of said first wheel results in movement of said third sheath portion which changes the curvature of said second sheath portion, the said change in curvature modifying the effective length of said coaxial cable to move said selector device to an operative position for energizing the power means for said second wheel, movement of said second wheel to a position corresponding to said first wheel being effective to slide the said inner member through said sheath to move said selector to an inoperative position responsive to movement of said second wheel.

5. In power steering apparatus, improved means for moving a second wheel in synchronism with a first wheel comprising:

a frame having a first portion connected to a second portion for movement relative thereto;

a first steerable wheel mounted on said first frame portion;

a second steerable wheel mounted on said second frame portion;

power means connected between said second wheel and said second frame portion for steering said second wheel;

control means for said power means on said first frame portion, said control means having flexible connections communicating with said power means;

a selector device in said control means adapted to move between operative and inoperative positions, said operative positions being effective to energize said power means to steer said second wheel and said inoperative position being effective to lock said power means and second wheel against movement; and an elongated flexible coaxial cable having an inner member slideable longitudinally relative to an outer sheath; said inner member being connected between said second wheel and said selector device, said sheath having a first portion connected to said second frame portion, and second curved sheath portion free to move transversely of itself, and a third sheath portion free to move axially of itself operably connected to said first wheel for movement as said first wheel is steered;

whereby steering movement of said first wheel moves said third sheath portion to change the curvature of said second sheath portion, the said change in curvature modifying the effective length of said cable to move said selector device to an operative position, and whereby the resulting movement of said second wheel moves the inner member relative to the sheath to move said selector device to an inoperative position upon said second wheel assuming a position corresponding to said first wheel.

6. In power steering apparatus, improved means for moving a second wheel in synchronism with a first wheel comprising:

a frame having a first portion connected to a second portion for movement relative thereto;

a first steerable wheel mounted on said first frame portion;

a second steerable wheel mounted on said second frame portion;

hydraulic piston and cylinder means connected between said second wheel and said second frame portion for steering said second wheel;

a valve on said first frame portion connected to said piston and cylinder means by flexible conduits;

a longitudinally shiftable spool in said valve adapted to move between inoperative and operative positions, said inoperative position being effective to lock said piston and said operative positions being effective to move said piston to steer said second wheel; and an elongated flexible coaxial cable having an inner member slideable longitudinally relative to an outer sheath, said inner member being connected between said second wheel and said spool, said sheath having one end connected to said second frame, an intermediate freely flexible curved portion and another end operably connected to said first wheel for movement therewith;

whereby steering movement of said first wheel changes the curvature of said sheath thereby modifying the effective length of said cable to move said spool to an operative position and whereby the resulting movement of said second wheel moves said inner member longitudinally within said sheath to return said spool to an inoperative position upon said second wheel assuming a position corresponding to said first wheel.

7. In power steering apparatus, improved means for moving a second wheel in synchronism with a first wheel comprising:

a frame having a first portion connected to a second portion for movement relative thereto;

a first steerable wheel mounted on said first frame portion;

a second steerable wheel mounted on said second frame portion;

hydraulic piston and cylinder means connected between said second wheel and said second frame portion for steering said second wheel;

a valve on said first frame portion connected to said piston and cylinder means by flexible conduits;

a longitudinally shiftable spool in said valve adapted to move between inoperative and operative positions, said inoperative position being effective to lock said piston and said operative positions being effective to move said piston to steer said second wheel;

an elongated flexible member having one end connected to said second wheel, said member having a curved portion intermediate its ends;

a spring connected between the other end of said flexible member and said spool; and a flexible tubular sheath encircling said flexible member along a portion intermediate the ends thereof, one end of said sheath being connected to said second frame portion and the other end of said sheath being operably connected to said first wheel for movement therewith;

whereby movement of said first wheel changes the curvature of said sheath and flexible member thereby modifying the effective length of said flexible member to exert a force on said spring which moves said spool to an operative position and whereby the resulting movement of said second wheel slides the flexible member longitudinally within said sheath to exert a force on said spring in the opposite sense to return said spool to an inoperative position upon said second wheel assuming a position corresponding to said first wheel.

8. In power steering apparatus for mine shuttle cars, improved means for steering a second wheel in synchronism with a first wheel comprising:

a frame having a wheel equalizer device mounted thereon;

a first steerable wheel mounted on said frame;

a second steerable wheel mounted on said equalizer device for vertical movement relative to said frame;

hydraulic piston and cylinder means connected between said second wheel and said equalizer device for steering said second wheel;

a valve on said frame connected to said piston and cylinder means by flexible conduits;

a longitudinally shiftable spool in said valve adapted to move between inoperative and operative positions, said inoperative position being effective to lock said piston and second wheel against steering movement and said operative positions being effective to supply power fluid to said piston for steering said second wheel;

an elongated flexible member having one end connected to said second wheel, said member having a curved portion between its ends;

a spring connected between the other end of said flexible member and said spool; and a flexible sheath encircling said flexible member along a portion intermediate the ends thereof, one end of said sheath being connected to said equalizer and the other end of said sheath being operably connected to said first wheel for movement therewith;

whereby steering movement of said first wheel moves said sheath thereby changing the curvature of said flexible member, the said change in curvature modifying the effective length of said flexible member to exert a force on said spring urging said spool to an operative position, and whereby the resulting movement of said second wheel slides the flexible member longitudinally relative to said sheath to exert a force on said spring in the opposite sense urging said spool to an inoperative position upon said second wheel assuming a position corresponding to said first wheel.

9. In a mine shuttle car having a first body portion hingedly connected to a second body portion, improved flexible means for steering a second wheel on said second body portion responsive to steering movement of a first wheel on said first body portion comprising:

power means on said second body portion connected to said second wheel to provide steering movement of said second wheel;

control means for said power means mounted on said first body portion, said control means having a selector device movable between operative and inoperative positions;

flexible conduits connecting said control means to said power means;

an elongated flexible member connected between said second wheel and said selector device, said member having a curved portion intermediate its ends; and an elongated flexible sheath encircling said flexible member between the ends thereof, said sheath having one end connected to said second body portion and its other end operably connected to said first wheel;

whereby steering movement of said first wheel moves said sheath longitudinally of itself to change the curvature of said flexible member, the said change in curvature modifying the effective length of said flexible member to urge said selector device to an operative position and whereby the resulting movement of said second wheel slides said flexible member relative to said sheath to urge said selector device to an inoperative position upon said second wheel assuming a position corresponding to said first wheel.

No references cited.

UNITED STATES PATENT OFFICE
CERTIFICATE OF CORRECTION

June 4, 1963

Patent No. 3,092,201

Paul A. Biek

It is hereby certified that error appears in the above numbered patent requiring correction and that the said Letters Patent should read as corrected below.

Column 7, line 5, for "and" read -- a --.

Signed and sealed this 3rd day of December 1963.

(SEAL)
Attest:
ERNEST W. SWIDER

Attesting Officer

EDWIN L. REYNOLDS

Acting Commissioner of Patents